United States Patent [19]

Biays et al.

[11] Patent Number: 5,363,151
[45] Date of Patent: Nov. 8, 1994

[54] COLOR CORRECTION FOR IMPROVED VISION THROUGH WATER AND OTHER ENVIRONMENTS

[76] Inventors: Alice de P. T. Biays; W. Tuckerman Biays, both of 633 Island Dr., Key Largo, Fla. 33037

[21] Appl. No.: 770,481

[22] Filed: Oct. 3, 1991

[51] Int. Cl.$^5$ ............................................. G02C 1/00
[52] U.S. Cl. ..................................... 351/43; 351/49; 359/464
[58] Field of Search ...................... 351/44, 47, 49, 43, 351/246; 359/464, 473, 475, 885

[56] References Cited

U.S. PATENT DOCUMENTS

| | | | |
|---|---|---|---|
| 623,975 | 2/1899 | Bennum . | |
| 893,972 | 7/1908 | Bayless . | |
| 1,340,579 | 5/1920 | Tousey . | |
| 1,562,319 | 11/1925 | Fairall . | |
| 2,032,139 | 2/1936 | Macy | 88/29 |
| 2,136,303 | 11/1938 | Lumiere | 88/16.6 |
| 3,294,556 | 12/1966 | Harrington | 106/52 |
| 3,430,053 | 2/1969 | Westhaver | 250/214 |
| 3,586,423 | 6/1971 | Zeltzer | 351/39 |
| 3,591,263 | 7/1971 | Esterson | 351/44 |
| 3,722,985 | 3/1973 | Laliberte | 350/311 |
| 4,202,601 | 5/1980 | Burbo | 350/159 |
| 4,247,177 | 1/1981 | Marks et al. | 351/44 |
| 4,300,818 | 11/1981 | Schachar | 351/7 |
| 4,429,959 | 2/1984 | Walters | 351/158 |
| 4,508,526 | 4/1985 | Dutcher | 493/346 |
| 4,542,959 | 9/1985 | Kreutzig | 359/464 |
| 4,602,856 | 7/1986 | Marks | 351/44 |
| 4,807,985 | 2/1989 | Feinbloom | 351/158 |
| 4,834,525 | 5/1989 | Vansaghi | 351/158 |

OTHER PUBLICATIONS

Murphy, "The Whale Sharpeye", *Skin Diver*, May 1987, pp. 46–47.
Harford, "Underwater Light and Instrumentation", *Handbook of Ocean and Underwater Engineering*, Myers (Ed)., McGraw–Hill, 1969, pp. 3-22-3-35.
Rowlands, *The Underwater Photographer's Handbook*, Van Nostrand Reinhold, pp. 74–75.
Schenck, Jr. et al, *Underwater Photography*, Cornell Maritime Press (Cambridge, Md.) 1957, Chapter IV: "Underwater Exposure-Natural Light", pp. 69–90.
Walker, "Take a Good Look at this Low Volume Cressi-sub Occhio Mask", *Skin Diver*, Aug. 1983, p. 55.
*Elements of Color in Professional Motion Pictures*, Society of Motion Picture and Television Engineers (SMPTE), 1957, pp. 10, 95–101.
Ultra Masks: advertisement.
Chino/Pro Dive masks: brochure.
Singh–Ray Marine-Photographic Filter: brochure.
TUSA: brochure, 1989.
Adams et al, "Exposure Control for Underwater Photography", *Electro-Optical Systems Design Conference*, 1971, pp. 336–339.

(List continued on next page.)

*Primary Examiner*—William L. Sikes
*Assistant Examiner*—Hung Xuan Dang
*Attorney, Agent, or Firm*—Pollock, Vande Sande & Priddy

[57] ABSTRACT

A method and apparatus for enhancing the vision of an individual viewing an object through an optical path through water. The method includes filtering the light that enters one eye of the individual to effect subtractive filtration to compensate for differential light absorption of water, and filtering light that enters the second eye of the individual which does not compensate for the differential light absorption of water. The apparatus includes two light transmitting elements, one of which filters light to effect subtractive filtration to compensate for differential light absorption by water and the other of which does not compensate for the differential absorption of light by water.

8 Claims, 6 Drawing Sheets

OTHER PUBLICATIONS

Cardone, "ClearOptic Lenses Add Color and Contrast to your Underwater World", *Skindiver,* May 1989.

Frink, "Warmer U/W Photos?: Special Filter has been Designed for U/W Available Light Photography", *Skindiver,* Dec. 1983, pp. 42–43.

Herbst, "New Filter Banishes the Underwater Blues", *Photo District News,* May 1986.

Hoffman, *Vision and the Art of Drawing,* Prentice Hall, 1989, "The Visual Circuit Described", p. 35, FIG. 4.1 and FIG. 4.2.

Holland, "Filters May Improve your U/W Photography", *Underwater USA,* Feb. 1988, p. 58.

Hurst, *Colour: A Handbook of the Theory of Colour,* 1900, Chapter II: "Cause of Colour in Coloured Bodies".

Kuleshov et al, "Thin–Film Absorption Light Filters", *Sov. J. Opt. Technol.,* Jan. 1979, p. 51.

UR/Pro Marine CY filter: brochure, Sep. 1983/Jan. 1984.

COLOR CORRECTION FOR IMPROVED VISION THROUGH WATER AND OTHER ENVIRONMENTS

DESCRIPTION

1. Field of the Invention

The present invention relates to a method and apparatus for providing color correction for divers, swimmers and for people viewing in-water scenery or exhibits as, for example, through aquarium windows or glass-bottom boats or glass-bottom buckets or submarine ports or periscopes and for providing enhanced vision in other environments.

2. Background Art

It has long been apparent to divers that scenes viewed through water look different from the way those scenes would look in the absence of the water. The physical explanation for this phenomenon is also well-known. Water molecules absorb the longer wavelengths of light more readily than the shorter wavelengths. As a result, bodies of water like the sea or even a swimming pool act like a blue-green filter. As the water path increases, the light becomes more and more diffuse, low contrast and monochromatic cyan. Under such lighting conditions, marine life and other objects are less visible to the human eye than they would be out of the water or lighted with "white light". Stated in other terms, the differential light absorption of water removes more of the red component of an image than of the blue-green component. As a result, regardless of the "true" colors of an image, viewed through water such an image will have more of a blue-green cast than would the image if viewed out of the water. A body of water containing large quantities of colored organic matter or other suspended material may exhibit additional colorcasts.

Earlier attempts to correct for the differential absorption, while exhibiting some improvements, have been singularly unsuccessful. This is due in part to the confusion caused by the fact that bodies of water vary locally from hour to hour, day to day, and season to season and also differ with geography. More particularly, the light absorbing properties of ocean water differ from distilled water and both differ from "fresh" water. Moreover, coastal ocean water can differ from deep sea water, lake water differs from river water and there are further subdivisions within each of these divisions. The copending application of Westhaver, Ser. No. 633,622, filed Dec. 28, 1990, proposes a solution to this dilemma in describing a filter with wide suitability for use in various kinds of in-water activities. As described in the Westhaver application, the disclosure of which is incorporated herein by reference, the through-water color correction is based on the optical properties of distilled water. Furthermore, notwithstanding the selection of a particular water characteristic, through-water color correction is not only a function of the optical properties of the water, but is also a function of the path length travelled by the light through the water. Accordingly, the Westhaver application describes a series of filter characteristics suitable for use in in-water activities. Which particular filter may be used in an in-water application depends on the path length. The filter characteristic described in the Westhaver application is a subtractive filter in that it compensates for the differential light absorption of water by its own differential absorption which is complementary to that of the water. As has been noted above, water acts as a blue-green filter and therefore the Westhaver filter acts as a red filter. Having properly selected a particular one of the filters described in the Westhaver application, the excess blue-green light transmitted by the water (relative to the original image) is balanced by the excess transmission of red through the filter, so that the overall transmission of the water path and the filter retains the original color balance. Nevertheless, inasmuch as the filtering action of water is a subtractive process (i.e. light intensity is reduced) and the physical phenomenon implemented by the filtering action is a further subtractive process (additional light intensity is removed), the overall image resulting from the use of a filter such as described in the Westhaver application is a color balanced, but reduced-intensity, image.

More particularly, the filter described in the Westhaver application corrects the visible spectrum in water permitting objects and life in-water to be viewed in their true colors. The filter is subtractive, i.e. it reduces a cyan light readily penetrating the sea to the remaining level of the red-area colors. For example, at 80 feet of depth, the water column and filter combined absorb approximately 90% of the surface light. The subtractive filtration makes it possible to see everything more color saturated and better defined, but it makes the distant water background appear darker. Furthermore, the filtration makes it appear difficult to see adequately in darker areas, such as under ledges. The darkening effect can have negative psychological ramifications, even for shallow water divers. In deep water where the eyes are already dilated the maximum amount and maximally adapted for minimal illumination, the filter can reduce the light to insufficient levels for seeing inside wrecks or caves or other areas not directly illuminated from the surface.

SUMMARY OF THE INVENTION

The invention overcomes the foregoing problems. Using the invention of this application, it is possible to have full color correction with no apparent loss of light or ability to see in dark areas.

The invention provides subtractive color correcting filtration for color correct viewing through water. The invention further provides a means of overcoming the physiological and psychological problems of excess light loss for human vision caused by subtractive filtration in situations where the ambient in-water light is too low.

The adaptive ability of the eye/mind combination provides two capabilities for vision that are not presently available for standard film and video imaging. First, human vision permits use of a single color correcting filter density for color correction through a vastly wider range of water path lengths than in other applications. Once a color correcting filter has enabled the eye/mind to see in the color-correct region, the mind can compensate for the over or under correction and refine the color to the true color of the scene. For example, with a non-color correcting dive mask viewing through a 40 foot water path, a model's skin tones appear blue-green; yet with a mask using the invention and compensating for a 30 foot water path, the model's skin tones and clothing and equipment appear the same colors as they are out of water. Furthermore, at 15 foot and 80 foot water paths those colors still appear "true" because with the assistance of a true color correction filter the mind is able to make allowances for what it "knows". Second, human vision permits use of color correction over one eye while leaving the second eye free for other types of correction or no correction at all.

Although the exact phenomena by which the invention achieves its results are not precisely understood, they are believed to be based on the adaptive capacity of the eye/brain physiology in the human being. It is known that human vision involves not only what is registered on the retina of the eye (a mechanical process), but also the processing of the information by the brain. Reduced to its essentials, the invention relies on the ability of the human brain to correlate the information received from two eyes in order to present a combined image for human perception.

One aspect of the invention is referred to as Bimonocular. In the Bimonocular aspect of the invention, the light viewed by one eye is color corrected using a filter such as that described in the Westhaver application. This eye then receives color-balanced light, albeit of reduced intensity. However, rather than using a similar or identical filter over the other eye, the other eye receives either unfiltered light or light which is filtered differently from that of the first eye. Preferably, the light intensity received by the second eye will be significantly higher than that received by the first eye. Apparently in melding the information provided by the two different eyes, the brain selects the desirable information from each eye to achieve a correlated image which on the one hand has the color balance achieved by using the color correcting filter, but on the other hand, has an intensity corresponding to the image received by the second eye. The overall result, then, of using the Bimonocular aspect of the invention, eliminates the necessity to choose between color loss through water or light loss through the filter and enables the diver to see bright images in correctly balanced color. Thus, in through-water applications, Bimonocular uses subtractive filtration which in effect provides greatly improved color, definition and contrast without apparent light loss.

In addition to the Bimonocular aspect of the invention, the invention also provides improved color vision for snorkelers and swimmers. For these individuals the invention provides the subtractive, color correcting filter bilaterally, i.e. the same filter over both eyes. In brightly lighted conditions, such as the sub-tropics and tropics, the invention provides protection against the glare of the sun at the water's surface. Like the Bimonocular version, the bilateral version of the invention is keyed to a variety of water path lengths and encompasses the corresponding family of color correcting filters.

Both versions of the invention can be used on all the numerous styles of dive masks, swim goggles and racing goggles. These masks and goggles may also have hydrophilic anti-fogging material applied to the user's side of the lenses. In cases where a manufacturer elects to provide the color correction on the user's side of the lens, the Bimonocular version provides an additional advantage. More particularly, prescription correction capability can be used easily with the clear lens, i.e. the lens with no color correction. Some standard diopter correction lenses are presently available for twin lens dive masks and these lenses are made with compound curves unsuitable for application of some forms of the color correction filters. Likewise, some divers have their optometrists glue more complex refraction prescription lenses onto the inside of their dive mask face plate, which could be incompatible with some forms of the color correction filters. In these instances Bimonocular enables the diver to select one eye for prescription correction and the other for color correction and to experience the advantages of both.

Additionally, Bimonocular enables in-water photographers and videographers to read camera settings without light loss and, in through-the-lens-viewing on cameras using color correcting filters, to see the scene most closely as it will record. In deep water where light levels get too low for subtractive color correction, especially inside caves or wrecks, Bimonocular provides the unfiltered eye the brightest ambient light for seeing, albeit without color correction.

While the use of the invention in dive masks or swimming and racing goggles has been described, the invention can also be employed in most situations in which an image or a scene is viewed through water. These include viewing in an aquarium, viewing through glass-bottom boats or glass-bottom buckets or submarine ports or periscopes or the like. In these environments the invention is used in items like eyeglasses and disposable eyeglasses worn by the viewer as well as on viewing scopes and on ports at the air/water interface. In each instance, color correction is provided; that color correction may be but need not be identical for both eyes of the viewer.

DETAILED DESCRIPTION OF PREFERRED EMBODIMENTS

As noted above, the copending Westhaver application (Ser. No. 633,622) describes a filter with wide suitability for use in various kinds of in-water activities. In particular, the Westhaver application describes a family of filters, each filter of which is associated with a different water path length. Examples of the curves characterized in the different filters of the family are included herein as FIGS. 4–13 which reproduce, respectively, FIGS. 2 and 4–12 of the Westhaver application.

Figure 1:
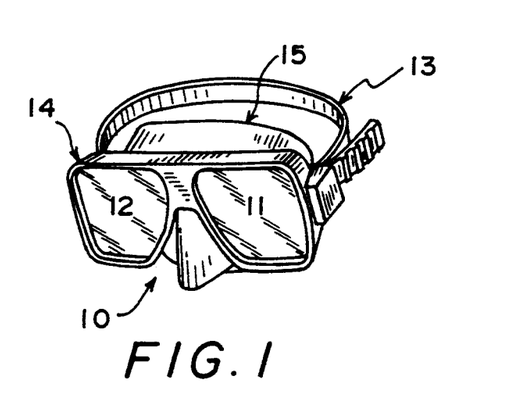
FIGS. 1 and 2 show two different forms of masks, each of which comprises an embodiment of the invention.

As is well-known in the field of in-water activity, dive masks are available in two generic forms. FIG. 1 shows one such form of a dive mask which includes lenses 11 and 12, each secured in a face contacting support 15 and arranged to be secured to the diver through a flexible strap 13. The lenses 11 and 12 are secured together by the frame 14. Such a mask, with a separate lens over each eye, is commonly called a twin lens, two lens or double lens mask. Swim goggles and racing goggles also have a separate lens over each eye. In accordance with the present invention, the lenses 11 and 12 may be different. Lens 11, for example, can be a color correcting lens implementing differential absorption such as illustrated by the optical characteristics of any one of FIGS. 4–13. Lens 12, on the other hand, has a different optical characteristic. Lens 12 may have a color correction that is less dense than lens 11 or the optical characteristic can be clear, i.e. fully transmitting all optical wavelengths, although that is not essential to the present invention.

Through water, the eye behind lens 11 receives a color balanced but low light-intensity image, while the eye behind lens 12 receives a color-distorted but higher light-intensity image. When desired, lens 12 can employ the same optical characteristic as lens 11. In other words, various combinations can be tailored to cover specific situations or varieties of situations. Furthermore, in the Bimonocular clear version, lens 12 may also include, if desired, a prescription correction.

Figure 2:
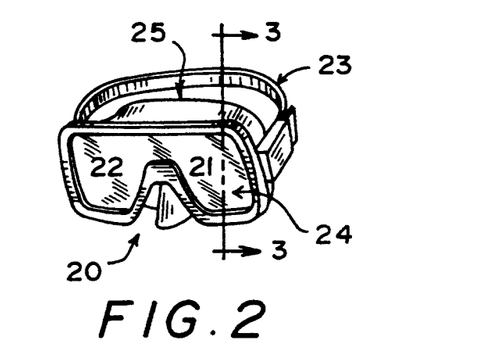
Figure 3:
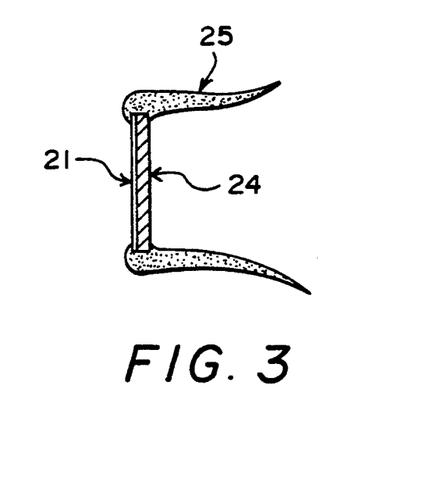
FIG. 3 is a cross-section of FIG. 2 taken on the line 3—33.
Figure 4:
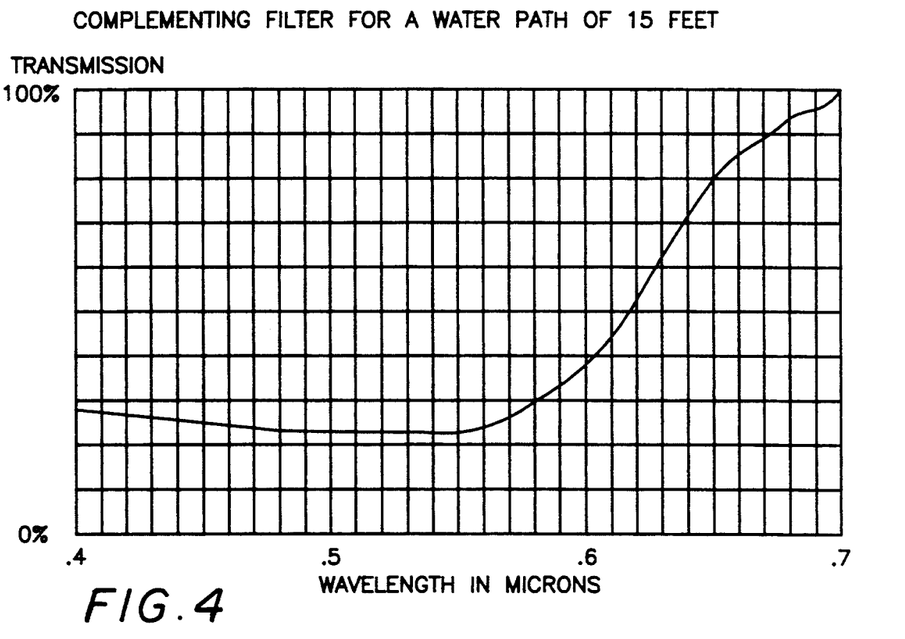
FIGS. 4–13 reproduce respectively FIGS. 2 and 4–12 of the Westhaver application and illustrate transmission characteristics of a color correcting filter, usable at different water path lengths.
Figure 5:
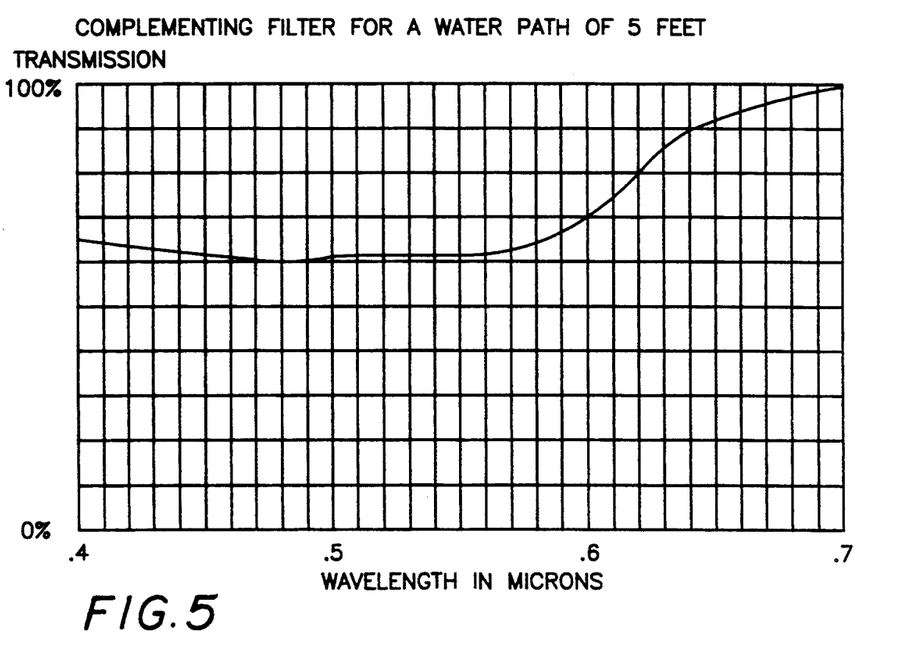
Figure 6:
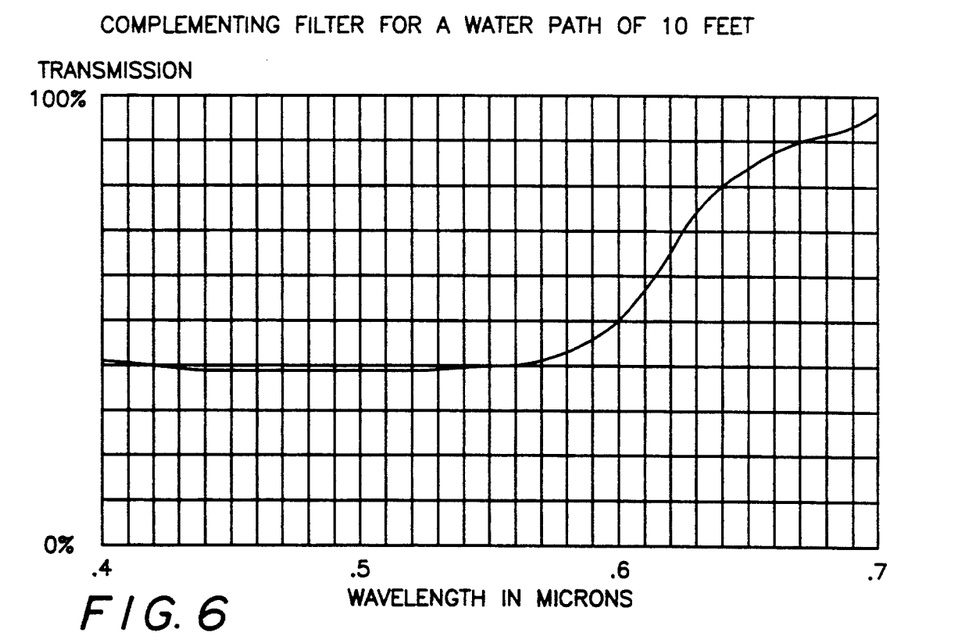
Figure 7:
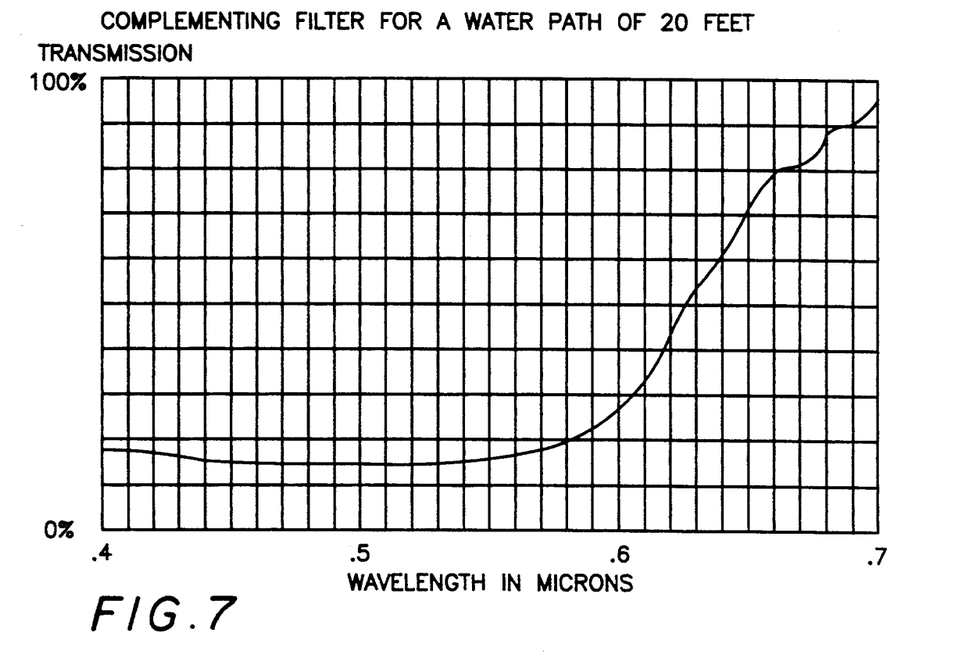
Figure 8:
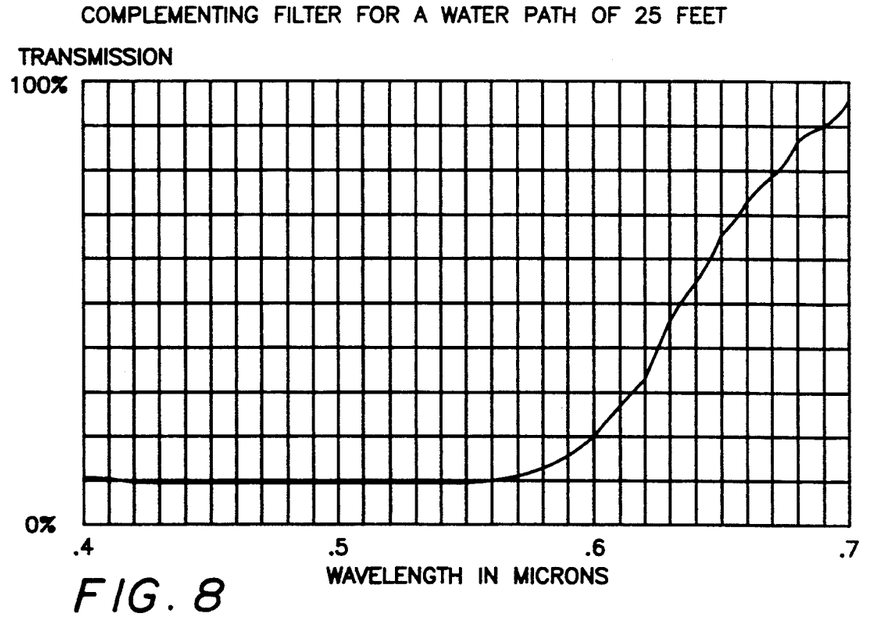
Figure 9:
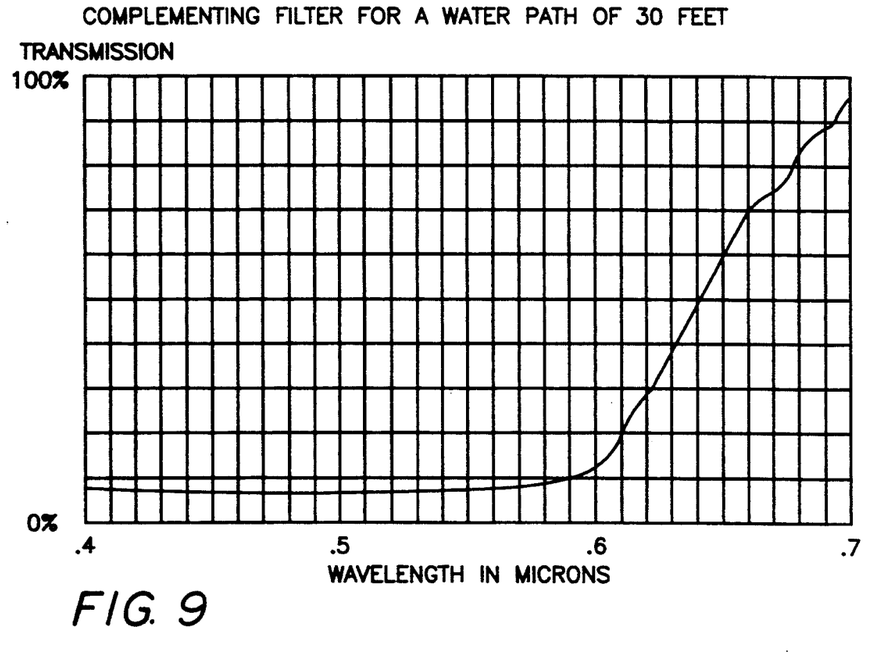
Figure 10:
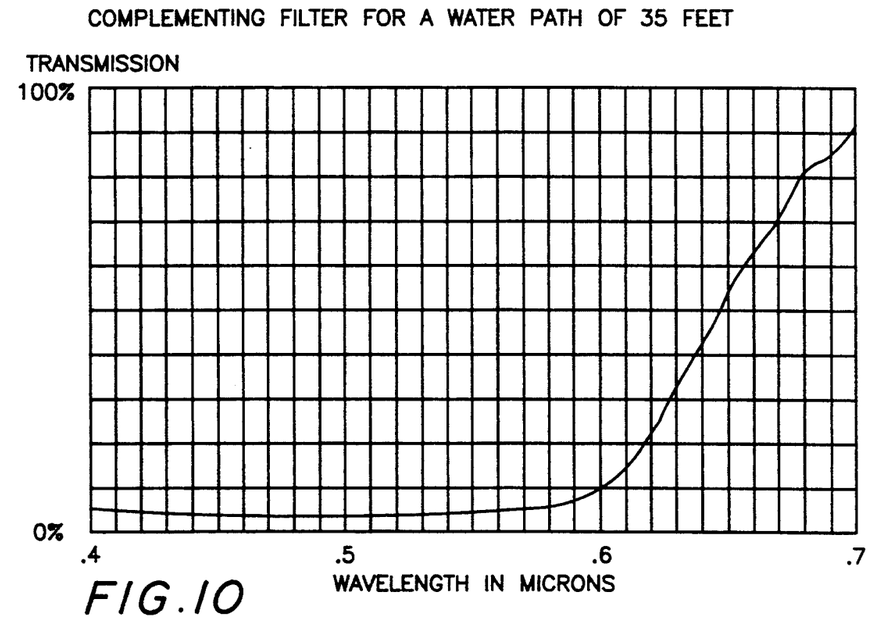
Figure 11:
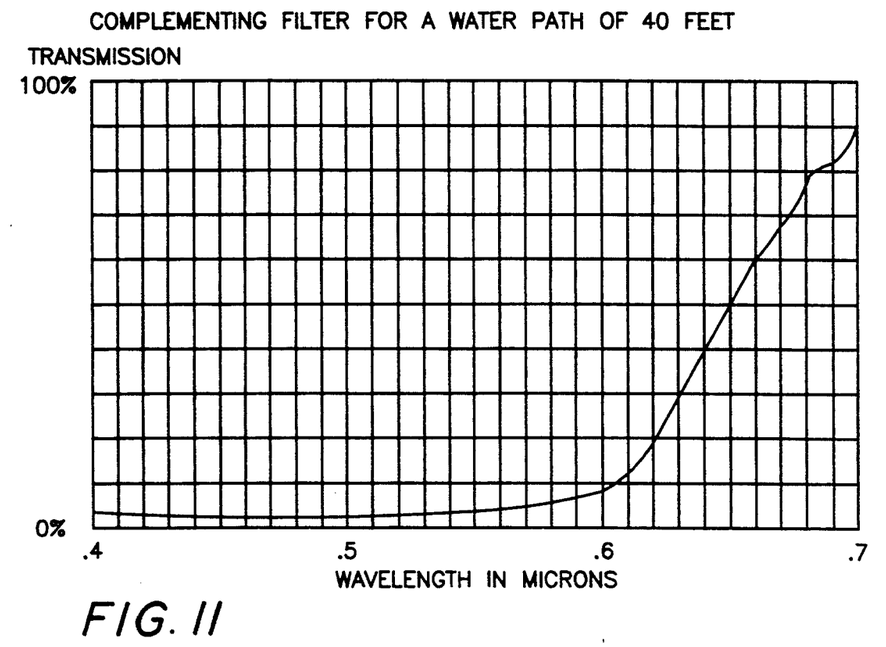
Figure 12:
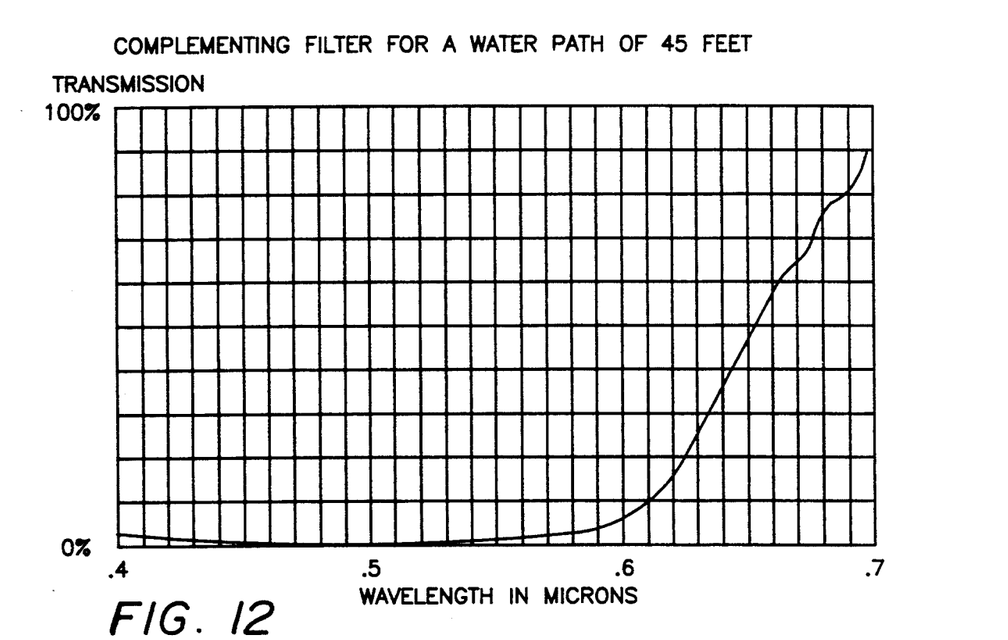
Figure 13:
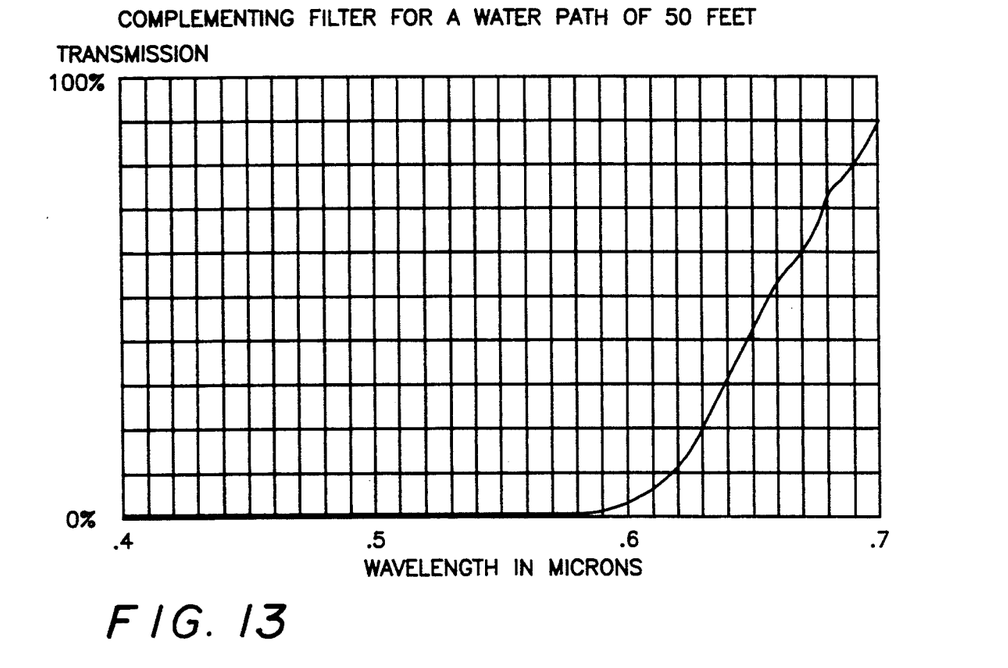

FIGS. 2 and 3 are a front and section view of an underwater dive mask of the second general configuration. In this configuration, a single lens 24 is employed which is supported by a face-contacting element 25, the entire mask being secured to the user through a flexible strap 23 or the like. The dive mask 20 includes, in addition to the lens 24, two color correcting components, a first component 21 and a second component 22. Color correcting element 21 exhibits differential optical absorption as illustrated in any of the curves in FIGS. 4–13. Element 22 can have a selected color correction which differs from the color correction of element 21. One form of element 22 exhibits no color correction or differential absorption at all. In use, a mask 20 will provide to the user's eye located behind the element 21, a color-balanced but low light-intensity image. On the other hand, the eye behind element 22 will receive a color-distorted but higher light-intensity image. When desired, element 22 can employ the same optical characteristic as element 21 so that both eyes receive the same color correction and light intensity. FIG. 3 is a cross-section taken along the lines 3—3 of the mask. As seen in FIG. 3, the face contacting support 25 supports the lens 24 and the color correcting element 21. In FIG. 2, the elements 21 and 22 may be adhesively secured to the lens 24. As an alternative, the elements 21 and 22 can be mechanically secured to the lens 24 using clamps or clips which are secured to the edges of the face contacting element 25. Other techniques of attaching the elements 21 and 22 to the lens 24 and/or to the face contacting element 25 will occur to those skilled in the art. It is only necessary that the elements 21 and 22 be sufficiently secure so that they are not dislodged in use. In other words, it is not essential that the elements 21 and 22 be permanently attached to the mask 20.

Likewise, the use of temporarily attached filter elements can also be employed in the mask 10 in FIG. 1. More particularly, a color correcting element or elements may be temporarily secured to the mask 10 for use in water and at other times the color correcting element or elements can be removed from the mask 10.

Figure 14:
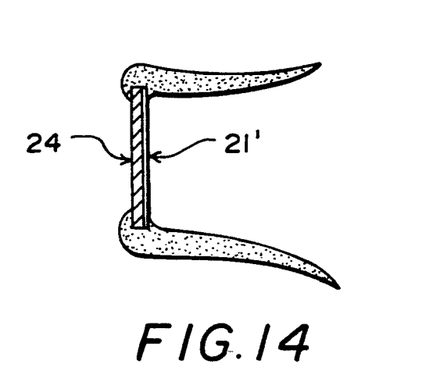
FIG. 14 is a cross-section similar to the section of FIG. 3.

The use of a hydrophilic anti-fogging coating is well-known to those skilled in the art. One application suggested for such an anti-fog coating is in dive masks. The color correcting filter of the present invention can be combined with the hydrophilic coating and the combined hydrophilic/filter coating applied to the user's side of the mask, as is shown in FIG. 14. FIG. 14 is a section which is similar to the section of FIG. 3. FIG. 3 shows a section of FIG. 2 wherein the color correcting element 21 for example is supported adjacent to the lens 24 of the mask 20. FIG. 14 shows a variation in which the combined color correcting and anti-fog element 21' is adjacent to the lens 24. FIG. 14 of course differs from FIG. 3 in that the color correcting element 21 in FIG. 3 is on the "outside" of the mask 20, whereas FIG. 14 shows that the combined color correcting and anti-fog coating 21' is located on the user's side of the mask 20. Coating 21' of FIG. 14 is a combination of the filter having the optical characteristics shown in this application, along with the hydrophilic anti-fogging material. The identical method is applicable to lenses 11 and 12 of mask 10, FIG. 1. The invention also includes locating a non-hydrophilic color correcting material on the user's side or on the outside.

Embodiments of the invention have been described in connection with FIGS. 1 and 2, wherein one lens or region of a mask (such as the lens 11 or the region 21) has transmission properties such as shown in a selected one of FIGS. 4–13, whereas the other lens or region (12 or 22) may be void of color correction capability. That, however, is not essential to the practice of the invention.

Another aspect of the invention is embodied in separating color correction into two components. For example, a color correcting dye can be separated into a yellow component (relatively high in light transmission) and a resulting component. The yellow component can be, for example, incorporated into the lens 12 or the region 22 (of FIGS. 1 and 2 respectively), with the remaining color correction component incorporated into the lens 11 or the region 21 (of FIGS. 1 and 2 respectively). In accordance with this embodiment of the invention, then, part of the color correction is implemented in one lens or region and the remainder of the color correction is implemented in a second lens or region. It should be apparent to those skilled in the art that the color transmission of the one lens or region will, of necessity, be different from the color transmission of the second lens or region and the two colors combine to form the desired color balance.

While this description includes the example in which the yellow component of the color correction has been separated out from the rest or remainder of the color correction, those skilled in the art will understand that the particular component which is segregated out can be varied throughout that portion of the overall color correction (as is embodied in any of FIGS. 4–13 for example).

FIGS. 1 and 2 show examples of masks in which the mask essentially comprises a face contacting element 15 which has top, bottom and side components. The "back" remains open and, in use, in contact with the wearer's face. The "front" has components which admit light for viewing. There are variations on these masks which include additional light admitting elements in the sides. These light admitting elements are referred to as side ports.

The invention extends to single and twin lens masks that also have side ports. The invention can be applied to one or both side ports.

FIGS. 1 and 2 illustrate embodiments of the invention which support color correction elements as a component of a mask which is supported by the user's head. FIG. 1 is similar to the embodiment of the invention as a component in eyeglasses worn out of water. As has already been mentioned, application of the invention is not restricted to an in-water environment. Furthermore, the Bimonocular eyeglasses are not restricted to through-water color correction. They are also made with, for example, a contrast filter for use through air in poor light or an atmosphere of clouds, haze, fog, rain, snow or sleet.

Figure 15:
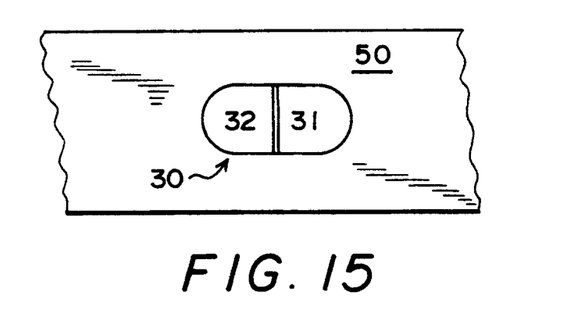
FIGS. 15 and 16 are front and side views illustrating application of the invention in a port 30 in an interface 50 between the environments 51 and 52.
Figure 16:
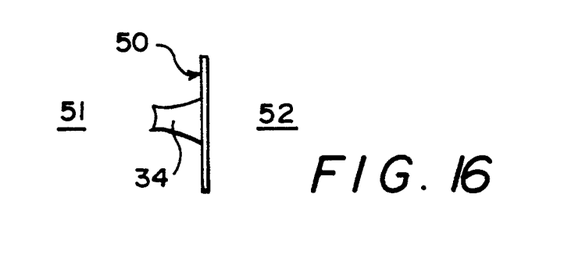

FIGS. 15 and 16 illustrate application of the invention in an environment which does not embody a mask or eyeglasses supported on a user's head. FIGS. 15 and 16, to the contrary, show a port 30 located in an interface 50 between an environment 51 and an environment 52. Surrounding the port 30 are elements 34 which serve to locate the head/face of an individual so that one of the individual's eyes is located opposite the region 31 of the port 30 and the other eye of the individual is located adjacent the region 32 of the port 30. The regions 31 and 32 can have the color correcting characteristics illustrated by the lens 11/12 (of FIG. 1) or the regions 21/22 (of FIG. 2). The port 30, for example, could be a viewing porthole in an aquarium or boat. Alternatively, the port 30 could be the viewing port in a periscope. Typically the interface 50 separates an environment 51, in which individuals can freely walk around, from the environment 52, which for example could be in water.

In all examples cited above, the color filtration or simply coloration is in a lens or in coatings that can be applied to lenses. Those skilled in the art of making colored lenses are familiar with numerous techniques for creating the colored lens. Methods for manufacturing the lenses for the masks, eyeglasses and other embodiments of the invention include, but are not limited to: dying (color-doping) plastic or glass; dying glue bonding two layers of glass or plastic; electrostatically applying micro-thin layers of colored coatings; making color correcting films and applying such films to the lenses; making separate filters by any of the above methods and affixing them temporarily or permanently over the mask lenses; making gradient density lenses or filters in at least two ways, 1) lightest at the bottom and densest color at the top, or 2) lightest at the center and concentrically denser color graduating outward, with the option of a totally clear center of 0.1 centimeter to 0.8 centimeter; uniform filtration with a totally clear center of 0.1 centimeter to 0.8 centimeter diameter in front of one or both eyes.

The descriptions above demonstrate that the invention applies to single and multiple lens masks and goggles, to eyeglasses, to periscopes, to viewing ports small and large. Preferred embodiments of both the bilateral and the Bimonocular aspects of the invention include: 1) complete masks, goggles, eyeglasses, periscopes, and viewing ports; 2) lenses for the foregoing items; 3) coatings for the foregoing lenses and items; 4) separate filters for attachment to masks, goggles, eyeglasses, periscopes and viewing ports and lenses.

It should be apparent from the foregoing that the invention finds application in many and varied settings and that the descriptions and examples provided herein are exemplary only. The invention is to be construed in accordance with the claims attached hereto.

We claim:

1. A method of enhancing through-water vision by an individual of an object through a water path having a length from about 5 feet to about 50 feet comprising the steps of:

filtering light entering one eye of said individual by a first light transmitting element to effect a subtractive filtration using a first filter selected to compensate for differential light absorption of water, and filtering light entering a second eye of said individual by a second light transmitting element which does not compensate for said differential light absorption of water.

2. A method of enhancing vision of an individual comprising the steps of:

providing first and second light transmitting elements for transmitting light to respective first and second eyes of the individual, filtering light entering said first eye of said individual by said first light transmitting element to effect a subtractive filtration to alter light entering the individual's first eye using a filter having light transmission characteristics substantially as shown in FIGS. 4–13 as a function of path length, and filtering light entering said second eye of said individual by said second light transmitting element to effect a filtration which is substantially different from the characteristics shown in FIGS. 4–13 as a function of path length.

3. A method as recited in claim 2 wherein the step of filtering light entering said second eye of said individual by said second light transmitting element is non-color correcting.

4. A method as recited in either claim 1 or claim 2 wherein the step of filtering light entering said second eye of said individual by said second light transmitting element provides for prescription correction.

5. Apparatus for enhancing through-water vision of an individual comprising:

first and second light transmitting elements for transmitting light received over a water path to respective first and second eyes of the individual, said first light transmitting element including means for filtering said light entering said first eye of said individual to effect a subtractive filtration to compensate for differential light absorption of water, and said second light transmitting element including means for filtering said light entering said second eye of said individual which does not compensate for said differential light absorption of water.

6. Apparatus as recited in claim 5 wherein said second light transmitting element is non-color correcting.

7. Apparatus for enhancing vision of an individual comprising:

first and second light transmitting elements for transmitting light to respective first and second eyes of the individual, said first light transmitting element including means for filtering light entering said first eye of said individual to effect a subtractive filtration with filter characteristics as a function of path length, as shown in FIGS. 4–13 and said second light transmitting element including means for filtering light entering said second eye of said individual which is substantially different from the characteristic shown in FIGS. 4–13 as a function of path length.

8. Apparatus as recited in either claim 5 or claim 7 wherein said second light transmitting element is prescription correcting.

* * * * *